G. BELLEMARE.
TIRE PROTECTOR.
APPLICATION FILED JUNE 15, 1911.
1,062,631.
Patented May 27, 1913.
2 SHEETS—SHEET 1.
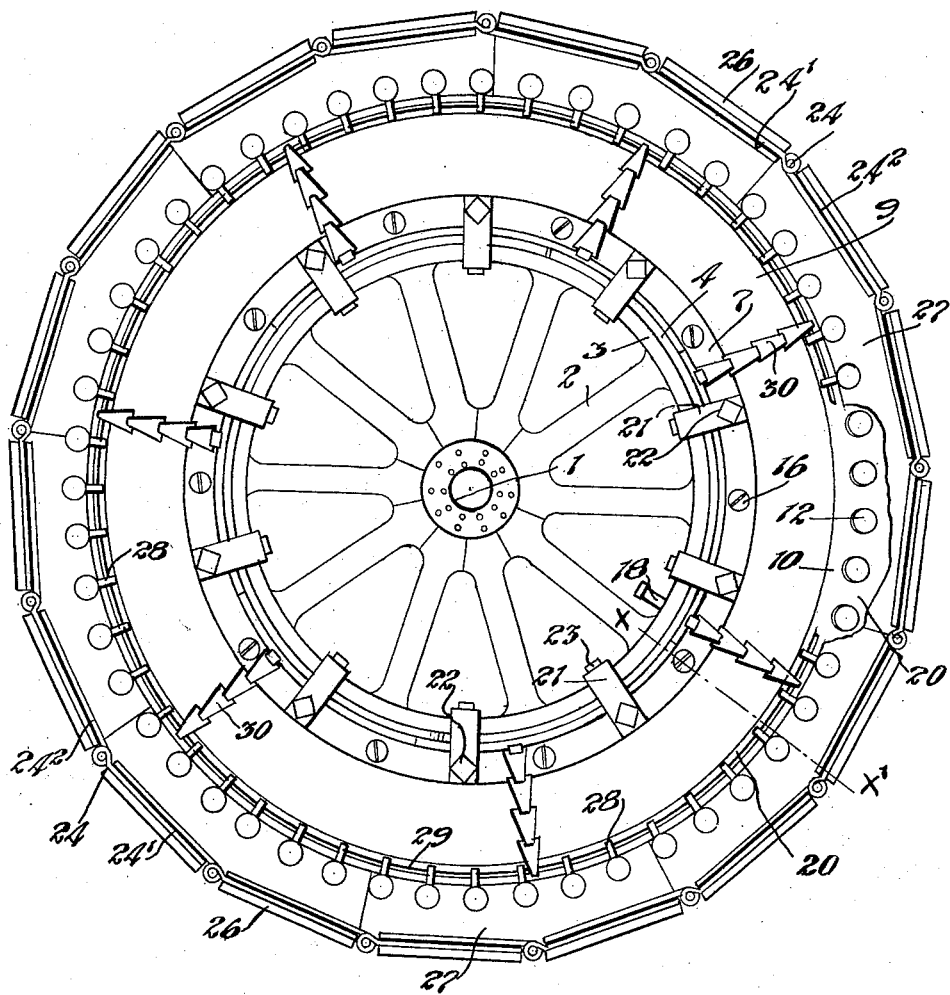
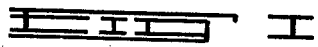
Witnesses
B. Foster
G. Thomson
Inventor
Geo. Bellemare
By Fred B. ...
Atty G. BELLEMARE.
TIRE PROTECTOR.
APPLICATION FILED JUNE 15, 1911.
1,062,631.
Patented May 27, 1913.
2 SHEETS—SHEET 2.
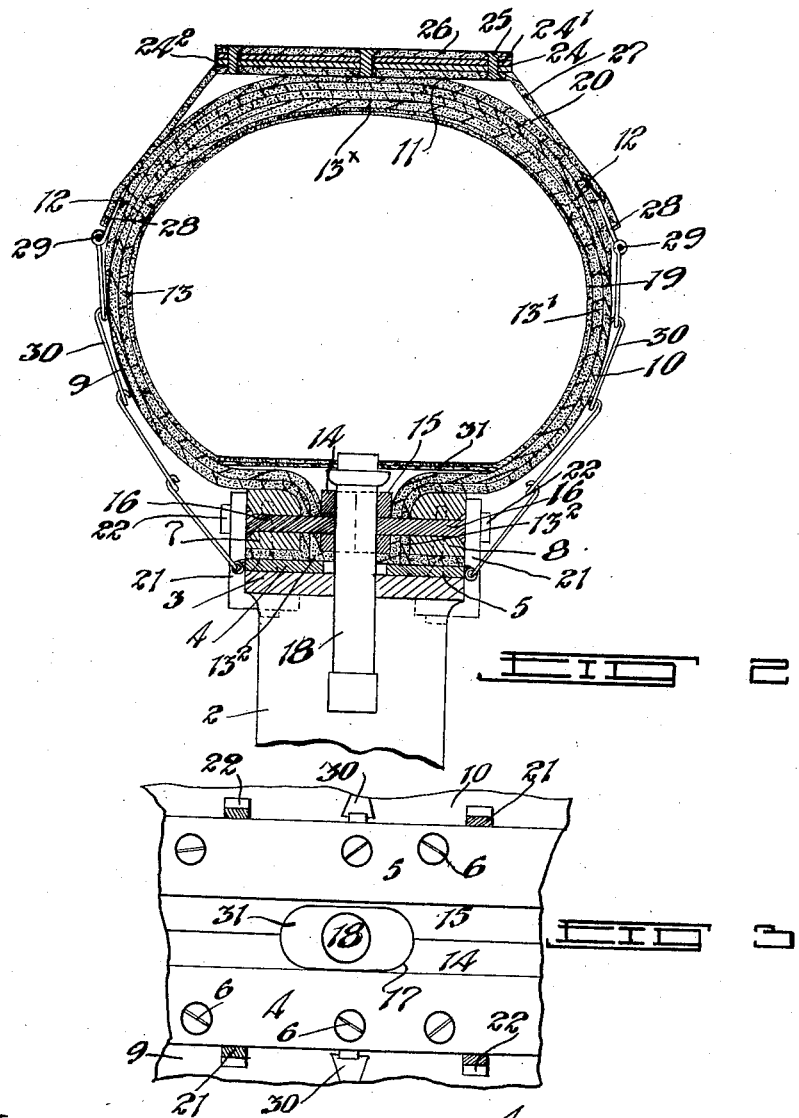
Witnesses
R Foster
G. Thomson
Inventor
Geo. Bellemare

UNITED STATES PATENT OFFICE.

GEORGE BELLEMARE, OF WINNIPEG, MANITOBA, CANADA.

TIRE-PROTECTOR.

1,062,631.  Specification of Letters Patent.  Patented May 27, 1913.

Application filed June 15, 1911. Serial No. 633,329.

*To all whom it may concern:*

Be it known that I, GEORGE BELLEMARE, of the city of Winnipeg, in the Province of Manitoba, Canada, have invented certain new and useful Improvements in Tire-Protectors, of which the following is the specification.

My invention relates to automobile tire protectors, and the object of the invention is to provide a durable and efficient tire protector which can be easily applied and removed and readily repaired.

With the above and other objects in view as will be more apparent as the description proceeds, the invention consists essentially in the arrangement and construction of parts hereinafter more particularly described and later pointed out in the appended claims.

Figure 1 is a side elevation of a complete tire fitted on to the usual automobile wheel. Fig. 2 represents an enlarged detailed cross sectional view through the tire. Fig. 3 is a plan view of a part of the inner side of the tire adjoining the nipple.

In the drawings like characters of reference indicate corresponding parts in each figure.

1 represents the hub of an ordinary wheel from which the spokes 2 extend and carry the rim 3.

4 and 5 represent two opposing metallic bands encircling the rim and located at the opposite edges thereof, which bands are firmly secured by screws 6 having countersunk heads to two opposing metallic outer rings 7 and 8, the rings being provided with threaded openings to receive the screws.

9 and 10 are two similar outer strips formed in this instance from specially treated leather or hide, which side pieces are overlapped at the top at 11 and have their free edges passing behind the respective rings 7 and 8, and between the bands 4 and 5 and the rings, where they are held solidly in position by the screws 6 already referred to. The overlapped strips are held together by rivets 12 which rivets also pass through inner leather strips 13, 13′ having their lower edges $13^2$ passing between the outer rings 7 and 8 and a pair of adjoining rings 14 and 15 held firmly to the rings 7 and 8 by threaded bolts 16 having their heads counter-sunk in the outer faces of the latter rings. The upper edges of the strips 13, 13′ are butted together and sewn at $13^x$.

The inner rings 14 and 15 bear against each other, when the tire is on the wheel and have an opening reserved at 17 therein to admit the usual nipple 18 passing from the inner inflatable rubber tubing 19 which is inserted within the strip 13, 13′.

20 is an outer leather strip passed around the overlapping edges of the side pieces 9 and 10 and held firmly by the rivets 12 hereinbefore referred to.

Clamps 21 are releasably secured to the outer rings 7 and 8 by threaded bolts 22. The clamps pass around the rim of the wheel and hold the tire to it. Adjusting screws 23 are carried by the clamps and engage with the inner side of the rim. Flat metallic hinges 24 have their wings 24′ $24^2$, overlapping the one on the other and fastened securely together by rivets 25, the rivets also holding leather sections 26 firmly to the faces of the outwardly disposed wings and fastening inner strips 27 to the inner faces of the inner disposed wings. The strips 27 carry loops 28 receiving wires 29, which shape and hold the strips to the outer face of the tire. The wires are in turn attached to the bands 4 and 5 by suitably disposed chains 30 having their outer ends connected to the wire, and their inner ends to the screws 6.

31 is a guard piece slipped over the inner face of the rubber tube to prevent it from being pinched between the inner rings 14 and 15 when the rings are drawn together by the bolts 16. A flexible fabric can be inserted within the tire if desired to protect the inner tube from the rivet heads.

It will be understood that the leather employed is treated to render it waterproof, and further that the rivets used are copper, so that there will be no corrosion.

A strong advantage gained in my tire is that it can be easily repaired in event of any of the parts giving out. New portions of leather can be inserted at any point by simply riveting them in as both the rings and bands can be easily removed by undoing first the bolts and then the screws.

What I claim as my invention is:

1. The combination with the rim of a wheel and an inflated tire carried by the rim, of a plurality of similar flat metallic hinges having the wings thereof overlapping one on the other and secured together, strips of material secured to the inner faces of the hinges and containing the tread side of the tire and means fastening the strips to the rim to the wheel, as and for the purpose specified.

2. The combination with the rim of a wheel and an inflated tire carried by the rim, of a plurality of flat metallic hinges having the wings overlapping the one on the other, sections located on the outer faces of the outer wings, strips of material located on the inner faces of the hinges, rivets passing through the strips hinges and sections and holding them together and means securing the edges of the strips to the rim of the wheel as and for the purpose specified.

Signed at Winnipeg, in the Province of Manitoba, this 28th day of March, 1911.

GEORGE BELLEMARE.

In the presence of—
G. S. ROXBURGH,
J. K. ELKIN.

---

Copies of this patent may be obtained for five cents each, by addressing the "Commissioner of Patents, Washington, D. C."